(12) United States Patent
Zeng et al.

(10) Patent No.: US 12,267,489 B2
(45) Date of Patent: Apr. 1, 2025

(54) CODING ALGORITHM FOR REALIZING DISTRIBUTED GRADUAL DECODING REFRESH

(71) Applicant: REALTEK SEMICONDUCTOR CORP., Hsinchu (TW)

(72) Inventors: Wei-Min Zeng, San Jose, CA (US); Chi-Wang Chai, Cupertino, CA (US); Wu-Jun Chen, Suzhou (CN); Wei Li, Suzhou (CN); Rong Zhang, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 164 days.

(21) Appl. No.: 18/075,934

(22) Filed: Dec. 6, 2022

(65) Prior Publication Data

US 2024/0187572 A1    Jun. 6, 2024

(51) Int. Cl.
*H04N 19/107* (2014.01)
*H04N 19/159* (2014.01)
*H04N 19/172* (2014.01)
*H04N 19/96* (2014.01)

(52) U.S. Cl.
CPC ......... *H04N 19/107* (2014.11); *H04N 19/159* (2014.11); *H04N 19/172* (2014.11); *H04N 19/96* (2014.11)

(58) Field of Classification Search
CPC .. H04N 19/107; H04N 19/159; H04N 19/172; H04N 19/96
USPC .................................................... 375/240.13
See application file for complete search history.

(56) References Cited

U.S. PATENT DOCUMENTS

| | | | |
|---|---|---|---|
| 2004/0066854 | A1 | 4/2004 | Hannuksela |
| 2021/0203971 | A1* | 7/2021 | Chen .................. H04N 19/117 |
| 2021/0360289 | A1* | 11/2021 | He ..................... H04N 19/119 |
| 2021/0409691 | A1* | 12/2021 | Hendry ................ H04N 19/30 |
| 2022/0060752 | A1* | 2/2022 | Pettersson ........... H04N 19/573 |

OTHER PUBLICATIONS

Limin Wang, Seungwook Hong, Krit Panusopone, "History-Based MVP (HMVP) for Gradual Decoding Refresh of VVC", International Conference on Visual Communications and Image Processing (VCIP), Munich, Germany, Dec. 2021 (Year: 2021).*

(Continued)

*Primary Examiner* — Allen C Wong
(74) *Attorney, Agent, or Firm* — WPAT, PC (57) ABSTRACT

A coding algorithm encodes consecutive frames of a video sequence and realizes distributed Gradual Decoding Refresh. The consecutive frames include a first frame, a second frame, and a third frame, and each frame is composed of (X+Y+Z) columns of coding tree units. The algorithm includes: coding X columns of the first frame in an intra coding manner and coding the other columns of the first frame in an inter coding manner and/or the intra coding manner; coding X columns of the second frame in the inter coding manner, coding Y columns of the second frame in the intra coding manner, and coding Z columns of the second frame in the inter and/or intra coding manner(s); and coding X and Y columns of the third frame in the inter coding manner, and coding Z columns of the third frame in the intra coding manner. The X/Y/Z columns (intra-coded columns) are inconsecutive.

18 Claims, 8 Drawing Sheets (56) References Cited

OTHER PUBLICATIONS

Ye-Kui Wang and Miska M. Hannuksela, "Gradual Decoder Refresh Using Isolated Regions", Joint Video Team (JVT) of ISO/IEC MPEG & ITU-T VCEG (ISO/IEC JTC1/SC29/WG11 and ITU-T SG16 Q.6) 3rd Meeting: Fairfax, Virginia, USA, May 6-10, 2002 (Year: 2002).*

Wang et al. "Gradual Decoding Refresh for Versatile Video Coding", 2021, pp. 3448-3452, Nokia Multimedia Technologies, IEEE.

1) OA letter of a counterpart TW application (appl. No. 112102465) mailed on Aug. 22, 2023. 2) Summary of the TW OA letter issued according to the TW counterpart application: (1) Claims 1-10 are rejected as being unpatentable over the cited reference 1 (Limin Wang; Seungwook Hong; Krit Panusopone, History-Based MVP (HMVP) for Gradual Decoding Refresh of VVC, 2021 International Conference on Visual Communications and Image Processing (VCIP), Jan. 19, 2022, https://ieeexplore.ieee.org/.

Limin Wang; "Seungwook Hong; Krit Panusopone, History-Based MVP (HMVP) for Gradual Decoding Refresh of VVC", 2021 International Conference on Visual Communications and Image Processing (VCIP), Jan. 19, 2022, https://ieeexplore.ieee.org/document/9675392.

* cited by examiner

I frame    P frames    I frame    P frames

☒ : CTU coded in intra coding manner
☐ : CTU coded in inter coding manner and/or intra coding manner
☐ : CTU coded in inter coding manner

S810 — coding X columns of CTUs of a first frame in an intra coding manner and coding the other (N-X) columns of CTUs of the first frame in one or both of an inter coding manner and the intra coding manner, and thereby generating a first distributed GDR frame, wherein the X columns of CTUs of the first frame are inconsecutive columns S820 — coding X columns of CTUs of a second frame in the inter coding manner and coding Y columns of CTUs of the second frame in the intra coding manner, and thereby generating a second distributed GDR frame, wherein the positions of the X columns of CTUs of the second frame are corresponding to the positions of the X columns of CTUs of the first frame and the Y columns of CTUs of the second frame as a whole is inconsecutive

Fig. 8

CODING ALGORITHM FOR REALIZING DISTRIBUTED GRADUAL DECODING REFRESH

BACKGROUND OF THE INVENTION

1. Field of the Invention

The present disclosure relates to a coding algorithm for image compression, especially to a coding algorithm for realizing distributed Gradual Decoding Refresh (GDR) applied in image compression.

2. Description of Related Art

A video sequence is composed of a series of frames. An image compression method is usually fulfilled by reducing the redundancy of the video sequence. The redundancy includes spectral redundancy, spatial redundancy, and temporal redundancy. The spectral redundancy refers to the similarity between the different color components of the same frame; the spatial redundancy refers to the similarity between neighboring pixels in a frame; and the temporal redundancy exists because image objects appearing in a previous frame are likely to appear in a current frame.

Figure 1:
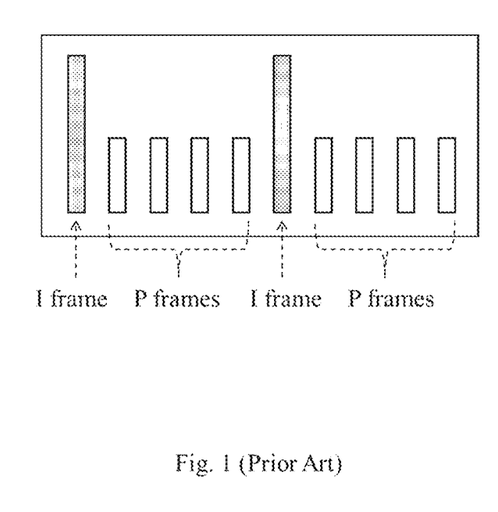
FIG. 1 shows the basic idea of an Instantaneous Decoding Refresh (IDR) algorithm.

Regarding compressed frames, a compressed frame without temporal redundancy compression (i.e., a compressed frame generated in an intra coding manner) is referred to as an intra frame (hereinafter referred to as "I frame"), and a compressed frame with temporal redundancy compression (i.e., a compressed generated in an inter coding manner) is referred to as an inter/predicted frame (hereinafter referred to as "P frame"). Frames of a compressed video sequence can roughly be grouped into I frames and P frames as shown in FIG. 1. The compression method for generating the frames in FIG. 1 is called an Instantaneous Decoding Refresh (IDR) algorithm. However, since the bit rate of an I frame is usually much higher than the bit rate of a P frame, the variation in the bit rate of a compressed video sequence generated with the IDR algorithm is unstable, which may cause the waste of the bandwidth.

Figure 2:
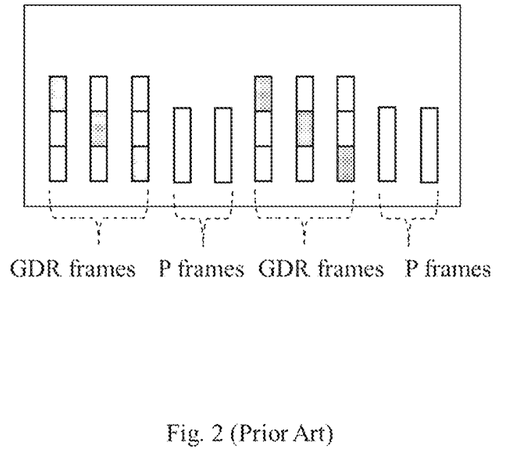
FIG. 2 shows the basic idea of a Gradual Decoder Refresh (GDR) algorithm.

To prevent the unstable variation in the bit rate of a compressed video sequence, a Gradual Decoder Refresh (GDR) algorithm is used to replace the IDR algorithm. FIG. 2 shows the basic idea of the GDR algorithm which uses three consecutive GDR frames to replace an I frame and the following two frames (e.g., an I frame and the following two P frames in FIG. 1). Since only a part of a GDR frame (i.e., the dotted area of each GDR frame in FIG. 2) is generated in an intra coding manner, the bit rate of the GDR frame is usually lower than the bit rate of an I frame. Accordingly, the GDR algorithm can ensure that the variation in the bit rate of the compressed video sequence is relatively stable. It is noted that the total number of frames (e.g., the ten frames in FIG. 2) of the compressed video sequence generated with the GDR algorithm is the same as the total number of frames (e.g., the ten frames in FIG. 1) of the compressed video sequence generated with the IDR algorithm.

Figure 3:
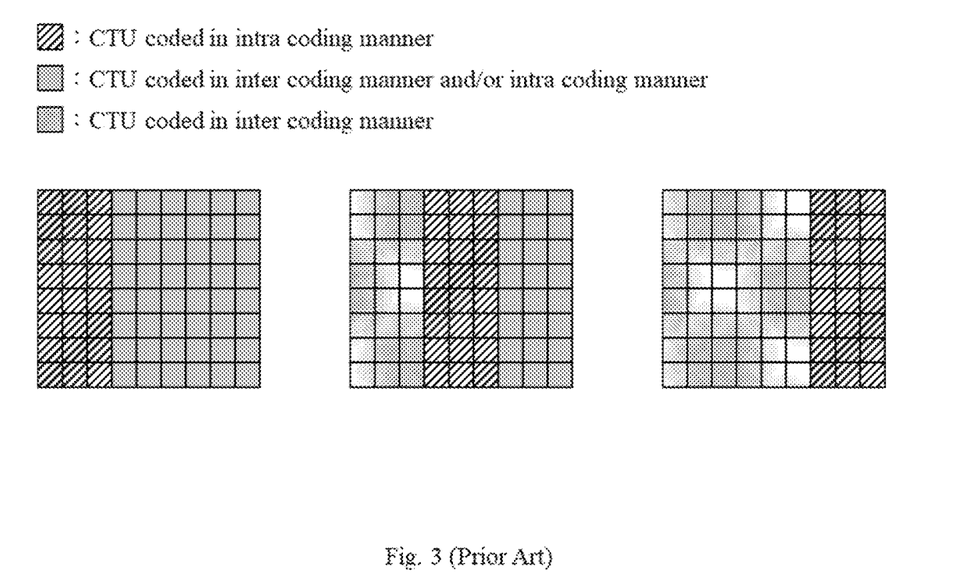
FIG. 3 shows a process for coding three consecutive GDR frames.

FIG. 3 shows a process for coding three consecutive GDR frames. During a real coding process, each frame is divided into multiple coding tree units (CTUs). These CTUs are coded from left to right and from top to bottom to generate a GDR frame. In FIG. 3, a square of each GDR frame denotes a coded CTU, the slash areas (i.e., the CTUs marked with slashes) of each GDR frame denote areas being coded in an intra coding manner, the dotted areas (i.e., the CTUs marked with dots) denote areas being coded in an inter coding manner, and the gray areas (i.e., the CTUs in gray) denote areas being coded in one or both of the intra and inter coding manners, wherein the amount of data of each coded area can be determined according to the demand for implementations. Generally, the slash areas are allowed higher bit rate and thus the compression artifacts of these areas are relatively less; the gray areas are allowed lower bit rate and thus the compression artifacts of these areas are relatively more. In FIG. 3, since the gray areas in a GDR frame are consecutive, the compression artifacts of these areas are easily perceived by human eyes. In addition, the slash areas in a GDR frame are allowed higher bit rate, and since these slash areas are consecutive in the same row of CTUs of the GDR frame, the time for making adjustments in the bit rate for the slash areas of the same row of CTUs is not ample and therefore the adjustments in the bit rate are hard to be accurate.

SUMMARY OF THE INVENTION

An object of the present disclosure is to provide a coding algorithm for realizing distributed Gradual Decoding Refresh (GDR) applied in image compression and thereby prevent the problems of the prior art.

An embodiment of the coding algorithm of the present disclosure encodes consecutive frames of a video sequence and thereby realizes distributed GDR. The consecutive frames include a first frame, a second frame, and a third frame in sequence, and each of the first frame, the second frame, and the third frame is composed of N columns of coding tree units (CTUs). This embodiment includes the following steps: coding X columns of CTUs of the first frame in an intra coding manner and coding the other (N−X) columns of CTUs of the first frame in one or both of an inter coding manner and the intra coding manner, and thereby generating a first distributed GDR frame, wherein the X columns of CTUs of the first frame are inconsecutive columns; coding X columns of CTUs of the second frame in the inter coding manner, coding Y columns of CTUs of the second frame in the intra coding manner, and coding the other (N−X−Y) columns of CTUs of the second frame in one or both of the inter coding manner and the intra coding manner, and thereby generating a second distributed GDR frame, wherein the positions of the X columns of CTUs of the second frame are corresponding to the positions of the X columns of CTUs of the first frame and the Y columns of CTUs of the second frame are inconsecutive columns; and coding X columns of CTUs of the third frame in the inter coding manner, coding Y columns of CTUs of the third frame in the inter coding manner, and coding Z columns of CTUs of the third frame in the intra coding manner, and thereby generating a third distributed GDR frame, wherein the positions of the X columns of CTUs of the third frame are corresponding to the positions of the X columns of CTUs of the second frame, the positions of the Y columns of CTUs of the third frame are corresponding to the positions of the Y columns of CTUs of the second frame, and the Z columns of CTUs of the third frame are inconsecutive columns, wherein the N is an integer equal to or greater than six, each of the X, the Y, and the Z is an integer equal to or greater than two.

Another embodiment of the coding algorithm of the present disclosure encodes consecutive frames of a video sequence and thereby realizes distributed GDR. The consecutive frames include a first frame and a second frame in sequence, and each of the first frame and the second frame is composed of N columns of CTUs. This embodiment includes the following steps: coding X columns of CTUs of the first frame in an intra coding manner and coding the other (N−X) columns of CTUs of the first frame in one or both of an inter coding manner and the intra coding manner, and thereby generating a first distributed GDR frame, wherein the X columns of CTUs of the first frame are inconsecutive columns; and coding X columns of CTUs of the second frame in the inter coding manner and coding Y columns of CTUs of the second frame in the intra coding manner, and thereby generating a second distributed GDR frame, wherein the positions of the X columns of CTUs of the second frame are corresponding to the positions of the X columns of CTUs of the first frame and the Y columns of CTUs of the second frame are inconsecutive columns, wherein the N is an integer equal to or greater than four, each of the X and the Y is an integer equal to or greater than two.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a coding algorithm for realizing distributed Gradual Decoding Refresh (GDR) applied in image compression. The coding algorithm can disperse intra-coded blocks (e.g., the columns of coding tree units (CTUs) mentioned in the later paragraphs) of a GDR frame to earn more time for adjusting the bit rate of these intra-coded blocks and to prevent compression artifacts from concentrating in some area of the GDR frame. The coding algorithm of the present disclosure can be applied to an encoder.

Figure 4:
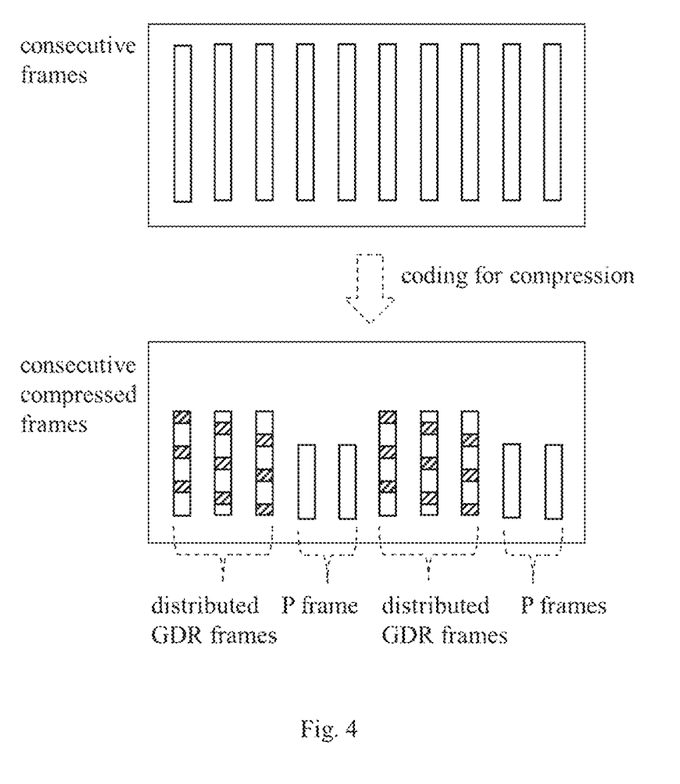
FIG. 4 shows the basic idea of the coding algorithm of the present disclosure.

FIG. 4 shows the basic idea of the coding algorithm of the present disclosure. FIG. 4 shows that consecutive frames of a video sequence are coded into consecutive compressed frames. In FIG. 4, the consecutive compressed frames include three distributed GDR frames, two inter/predicted frames (hereinafter referred to as "P frames"), three distributed GDR frames, two P frames, and so on and so forth, but the implementation of the present invention is not limited thereto. In FIG. 4, every three consecutive distributed GDR frames are used to replace one intra frame (hereinafter referred to as "I frame") and two P frames following the I frame (e.g., an I frame and the following two P frames in FIG. 1), and the intra-coded blocks (i.e., the blocks marked with slashes) in each of the three consecutive distributed GDR frames are inconsecutive. Accordingly, the coding algorithm can earn more time for adjusting the bit rate of the intra-coded blocks of each distributed GDR frame and prevent compression artifacts from concentrating in some area of the distributed GDR frame.

Figure 5:
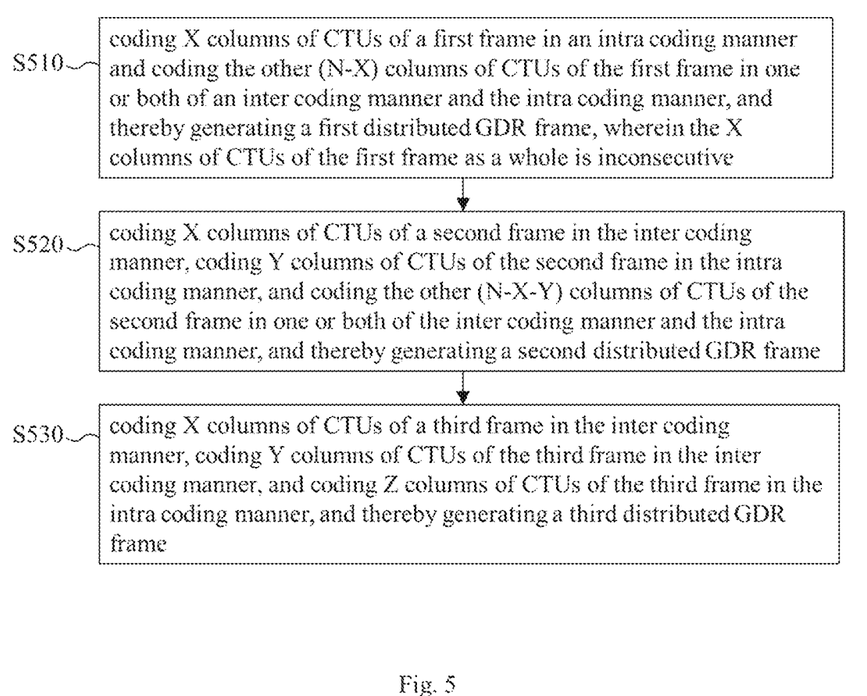
FIG. 5 shows an embodiment of the coding algorithm of the present disclosure.

FIG. 5 shows an embodiment of the coding algorithm of the present disclosure. This embodiment encodes consecutive frames of a video sequence. The consecutive frames include a first frame, a second frame, a third frame, and so on in sequence. Each of the first, second, and third frames is composed of N columns of coding tree units (CTUs). The N columns of CTUs include X columns of CTUs, Y columns of CTUs, and Z columns of CTUs, wherein the X columns of CTUs as a whole is inconsecutive, and so are the Y columns of CTUs and the Z columns of CTUs. The basic unit of each column of CTUs is a CTU which is known in the field of coding technologies. The N is an integer equal to or greater than six, and each of the X, the Y, and the Z is an integer equal to or greater than two. The embodiment of FIG. 5 includes the following steps:

S510: coding X columns of CTUs of the first frame in an intra coding manner and coding the other (N−X) columns of CTUs of the first frame in one or both of an inter coding manner and the intra coding manner, and thereby generating a first distributed GDR frame (e.g., the left frame in FIG. 6), wherein the X columns of CTUs of the first frame as a whole is inconsecutive. Step S510 may further include at least one of the following features:

(1) The X columns of CTUs of the first frame are coded in the intra coding manner without referring to the data of the (N−X) columns of CTUs of the first frame. For example, a process for coding the X columns of CTUs of the first frame is only allowed to refer the data of the X columns of CTUs of the first frame.

(2) Any two columns of the X columns of CTUs of the first frame are inconsecutive columns. Accordingly, any two columns of intra-coded CTUs of the first distributed GDR frame (e.g., any two columns of CTUs marked with slashes of the left frame in FIG. 6) are inconsecutive columns.

Figure 6:
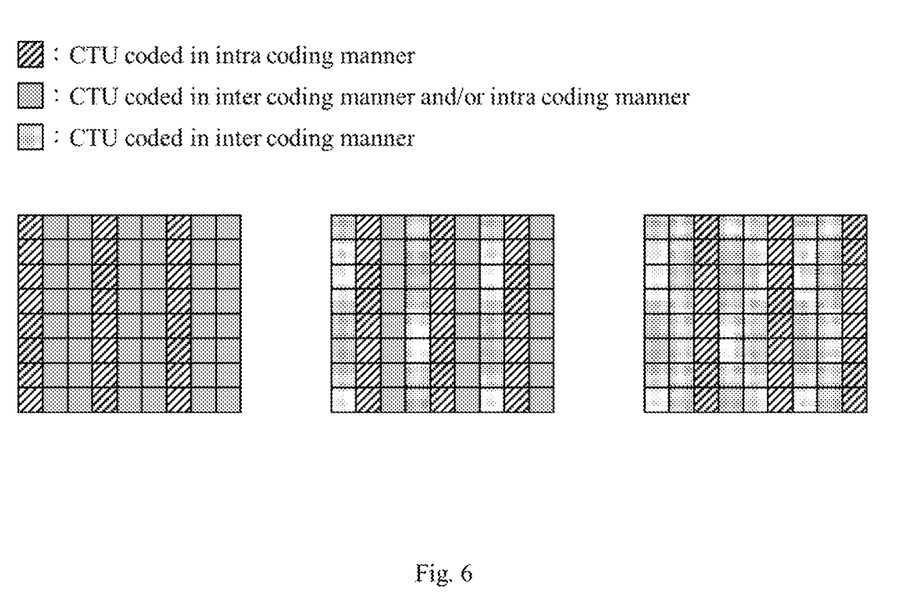
FIG. 6 shows an embodiment for generating the first, second, and third distributed GDR frames of FIG. 5.

S520: coding X columns of CTUs of the second frame in the inter coding manner, coding Y columns of CTUs of the second frame in the intra coding manner, and coding the other (N−X−Y) columns of CTUs of the second frame in one or both of the inter coding manner and the intra coding manner, and thereby generating a second distributed GDR frame (e.g., the middle frame in FIG. 6). The positions of the X columns of CTUs of the second frame are corresponding to the positions of the X columns of CTUs of the first frame. The Y columns of CTUs of the second frame as a whole is inconsecutive. Step S520 may further include at least one of the following features:

(1) The aforementioned (N−X) columns of CTUs of the first frame are classified under unreliable reference, and thus the (N−X) columns of CTUs of the first frame are defined as dirty areas. Accordingly, the X columns of CTUs of the second frame are coded in the inter coding manner without referring to the data of the (N−X) columns of CTUs of the first frame. To be more specific, after the X columns of CTUs of the first frame have been coded in the intra coding manner, these intra-coded X columns of CTUs of the first frame are defined as clean areas, and thus a process for coding the X columns of CTUs of the second frame in the inter coding manner is only allowed to refer to the data of the intra-coded X columns of CTUs of the first frame (i.e., the corresponding X columns of CTUs of the first distributed GDR frame).

(2) The (N−X−Y) columns of CTUs of the second frame are classified under unreliable reference, and thus the (N−X−Y) columns of CTUs of the second frame are defined as dirty areas. Accordingly, the Y columns of CTUs of the second frame are coded in the intra coding manner without referring to the data of the (N−X−Y) columns of CTUs of the second frame. To be more specific, the X columns of CTUs of the second frame are coded in the inter coding manner with referring to reliable reference (i.e., the data of the X columns of CTUs of the first distributed GDR frame) and thus the inter-coded X columns of CTUs of the second frame are defined as clean areas; accordingly, a process for coding the Y columns of CTUs of the second frame in the intra coding manner is only allowed to refer to the data of the inter-coded X columns of CTUs of the second frame (i.e., the corresponding X columns of CTUs of the second distributed GDR frame) and the data of the Y columns of CTUs of the second frame.

(3) Any two columns of the Y columns of CTUs of the second frame are inconsecutive columns. Accordingly, any two columns of intra-coded CTUs of the second distributed GDR frame (e.g., any two columns of CTUs marked with slashes of the middle frame in FIG. 6) are inconsecutive columns.

S530: coding X columns of CTUs of the third frame in the inter coding manner, coding Y columns of CTUs of the third frame in the inter coding manner, and coding Z columns of CTUs of the third frame in the intra coding manner, and thereby generating a third distributed GDR frame (e.g., the right frame in FIG. 6). The positions of the X columns of CTUs of the third frame are corresponding to the positions of the X columns of CTUs of the second frame, the positions of the Y columns of CTUs of the third frame are corresponding to the positions of the Y columns of CTUs of the second frame, and the Z columns of CTUs of the third frame as a whole is inconsecutive. Step S530 may further include at least one of the following features:

(1) The X, the Y, and the Z are the same.

(2) The N is equal to (X+Y+Z), and consequently the first distributed GDR frame, the second distributed GDR frame, and the third distributed GDR frame are used to replace three consecutive Instantaneous Decoding Refresh (IDR) frames beginning with an I frame (e.g., an I frame and the following two P frames in FIG. 1). Generally, provided the width of each frame of a video sequence is $W_{FRAME}$ (pixels), the sum of widths of the total intra-coded areas of a distributed GDR frame is $W_{GDR}$ (pixels), and $W_{FRAME}/W_{GDR}$ is equal to an integer "K", K distributed GDR frames can jointly replace K consecutive IDR frames beginning with an I frame. If $W_{FRAME}/W_{GDR}$ is not an integer, $W_{FRAME}/W_{GDR}$ can be rounded up to the nearest whole digit which is then treated as the K.

(3) The (N−X−Y) columns of CTUs of the second frame are classified under unreliable reference, and thus the (N−X−Y) columns of CTUs of the second frame are defined as dirty areas. Accordingly, the X columns of CTUs of the third frame and the Y columns of CTUs of the third frame are coded in the inter coding manner without referring to the data of the (N−X−Y) columns of CTUs of the second frame. To be more specific, after the X and Y columns of CTUs of the second frame have been coded, the coded X and Y columns of CTUs of the second frame are defined as clean areas; accordingly, a process for coding the X and Y columns of CTUs of the third frame in the inter coding manner is only allowed to refer to the data of the coded X and Y columns of CTUs of the second frame (i.e., the corresponding X and Y columns of CTUs of the second distributed GDR frame).

(4) The N is greater than (X+Y+Z), and the embodiment of FIG. 5 further generates at least one distributed GDR frame (e.g., the fourth distributed GDR frame); in this case, the other (N−X−Y−Z) column(s) of CTUs of the third frame is/are classified under unreliable reference, and thus the Z columns of CTUs of the third frame are coded in the intra coding manner without referring to the data of the (N−X−Y−Z) column(s) of CTUs of the third frame; additionally, step S530 further includes: coding the (N−X−Y−Z) in one or both of the inter coding manner and the intra coding manner. To be more specific, the X and Y columns of CTUs of the third frame are coded in the inter coding manner with referring to reliable reference (i.e., the data of the X and Y columns of CTUs of the second distributed GDR frame) and thus the X and Y columns of CTUs of the third frame are defined as clean areas; accordingly, a process for coding the Z columns of CTUs of the third frame in the intra coding manner is only allowed to refer to the data of the coed X and Y columns of CTUs of the third frame (i.e., the corresponding X and Y columns of CTUs of the third distributed GDR frame) and the data of the Z columns of CTUs of the third frame.

(5) Any two columns of the Z columns of CTUs of the third frame are consecutive or inconsecutive. Accordingly, any two columns of intra-coded CTUs of the third distributed GDR frame (e.g., any two columns of CTUs marked with slashes of the right frame in FIG. 6) are inconsecutive columns.

The embodiment of FIG. 5 can optionally include at least one of the following features:

(1) Regarding each of the first, second, and third frames, any two columns of the N columns of CTUs have the same horizontal widths and vertical lengths, and the vertical length of each of the N columns of CTUs is the same as the vertical length of each of the first, second, and third frames.

(2) The amount of data of the first distributed GDR frame is less than the amount of data of the first frame, the amount of data of the second distributed GDR frame is less than the amount of data of the second frame, and the amount of data of the third distributed GDR frame is less than the amount of data of the third frame.

(3) The distribution of the X columns of CTUs of the first frame are predetermined or randomly determined, the distribution of the Y columns of CTUs of the second frame are predetermined or randomly determined, and the distribution of the Z columns of CTUs of the third frame are predetermined or randomly determined.

FIG. 6 shows an embodiment for generating the first, second, and third distributed GDR frames of FIG. 5. In FIG.

Figure 7:
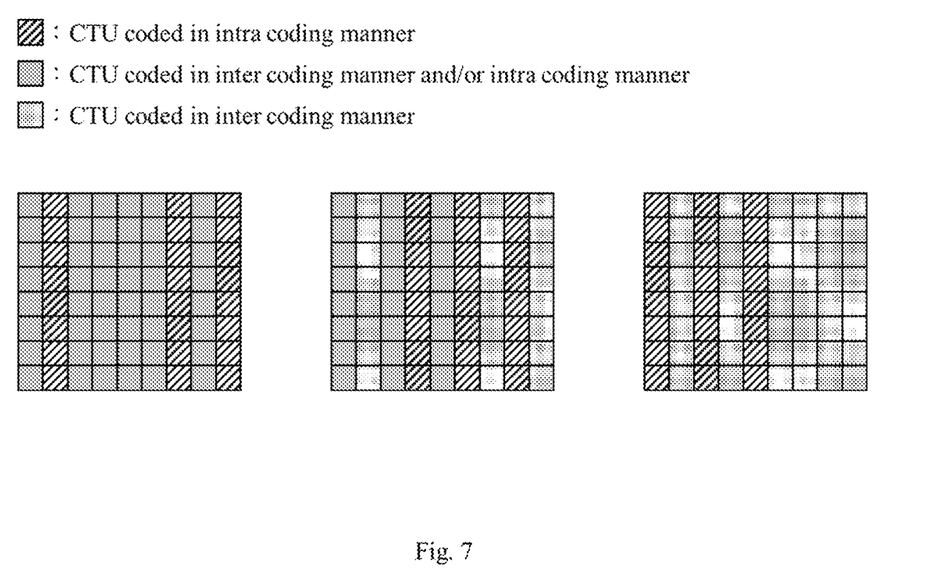
FIG. 7 shows another embodiment for generating the first, second, and third distributed GDR frames of FIG. 5.

6, each square of each distributed GDR frame denotes a coded CTU (i.e., coded unit), the size of each CTU is 64×64 (pixels), the slash areas of each distributed GDR frame denote areas being coded in the intra coding manner, the dotted areas denote areas being coded in the inter coding manner, and the gray areas denote areas being coded in one or both of the intra and inter coding manners, wherein the amount of data of each coded area can be determined according to the demand for implementations. In order to improve the visual effect of the video sequence, the bit rate for different areas can be adjusted dynamically, wherein compression artifacts in the slash areas being allowed higher bit rate are usually less, compression artifacts in the dotted area being allowed lower bit rate are usually more, and compression artifacts in the gray areas being allowed least bit rate are usually more than the compression artifacts of the other areas; however, the implementation of the present invention is not limited to the above features. In FIG. 6, the gray areas of each distributed GDR frame as a whole is inconsecutive, and thus the compression artifacts of the gray areas are hard to be perceived by human eyes. In addition, regarding the same distributed GDR frame in FIG. 6, the slash areas are usually allowed higher bit rate, and since the slash areas in the same row of CTUs are inconsecutive, which means that any two CTUs marked with slashes in the same row of CTUs are inconsecutive, the time for making adjustments in the bit rate for the slash areas of the same row of CTUs is ample and thus the adjustments in the bit rate can relatively be accurate. It is noted that the distribution pattern of the slash, dotted, and gray areas of each distributed GDR frame in FIG. 6 is exemplary for understanding of the present invention, and people having ordinary skill in the art can derive other distribution patterns (e.g., FIG. 7) from the present disclosure.

Figure 8:
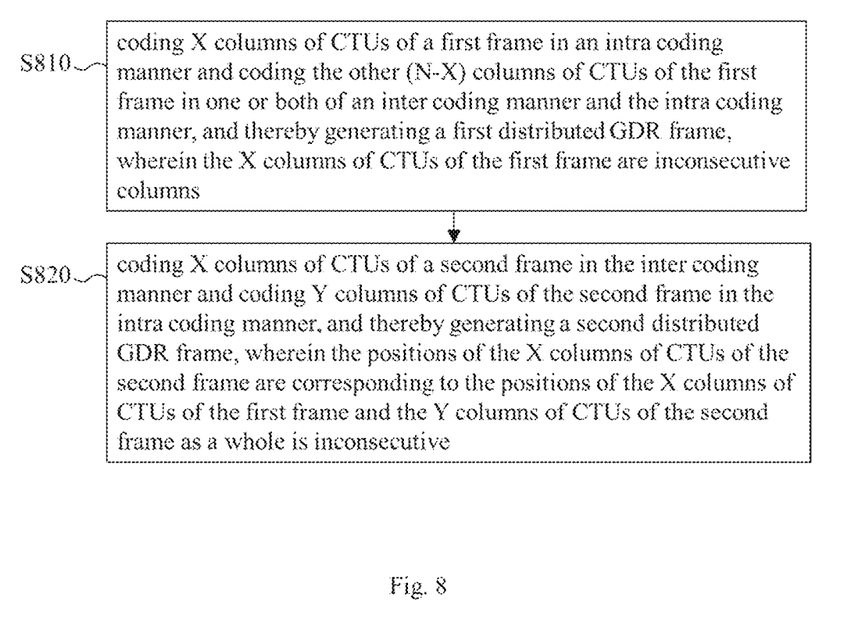
FIG. 8 shows another embodiment of the coding algorithm of the present disclosure.

FIG. 8 shows another embodiment of the coding algorithm of the present disclosure. This embodiment encodes consecutive frames of a video sequence and thereby realizes distributed GDR. The consecutive frames include a first frame and a second frame in sequence, and each of the first frame and the second frame is composed of N columns of CTUs. The N columns of CTUs include X columns of CTUs and Y columns of CTUs, wherein the overall X columns of CTUs and/or the overall Y columns of CTUs are inconsecutive. The basic unit of each column of CTUs is a CTU. The N is an integer equal to or greater than four, and each of the X and the Y is equal to or greater than two. This embodiment includes the following steps:

S810: coding X columns of CTUs of the first frame in an intra coding manner and coding the other (N−X) columns of CTUs of the first frame in one or both of an inter coding manner and the intra coding manner, and thereby generating a first distributed GDR frame, wherein the X columns of CTUs of the first frame as a whole is inconsecutive.

S820: coding X columns of CTUs of the second frame in the inter coding manner and coding Y columns of CTUs of the second frame in the intra coding manner, and thereby generating a second distributed GDR frame, wherein the positions of the X columns of CTUs of the second frame are corresponding to the positions of the X columns of CTUs of the first frame, and the Y columns of CTUs of the second frame as a whole is inconsecutive. It is noted that when the N is equal to (X+Y), the first distributed GDR frame and the second distributed GDR frame jointly replace two consecutive IDR frames beginning with an I frame, that is to say the two consecutive frames are the I frame and a P frame following the I frame.

It is noted that provided the N is greater than (X+Y), the embodiment of FIG. 8 further generates at least one GDR (e.g., a third distributed GDR frame). In this case, the other (N−X−Y) columns of CTUs of the second frame in step S820 are classified under reliable reference, and thus the Y columns of CTUs of the second frame are coded in the intra coding manner without referring to the data of the (N−X−Y) columns of CTUs of the second frame. In addition, step S820 further includes: coding the other (N−X−Y) columns of CTUs of the second frame in one or both of the inter coding manner and the intra coding manner.

Since those having ordinary skill in the art can refer to the embodiments of FIGS. 4~7 to appreciate the detail and modification of the embodiment of FIG. 8, repeated and redundant description is omitted here.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible based on the present disclosure.

To sum up, the coding algorithm of the present disclosure can disperse intra-coded columns of CTUs of a distributed GDR frame to earn more time for adjusting the bit rate of these intra-coded columns and to prevent compression artifacts from concentrating in some area of the distributed GDR frame.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A coding algorithm for encoding consecutive frames of a video sequence and thereby realizing distributed Gradual Decoding Refresh (GDR), wherein the consecutive frames include a first frame, a second frame, and a third frame in sequence, each of the first frame, the second frame, and the third frame is composed of N columns of coding tree units (CTUs), and the coding algorithm comprises:

coding X columns of CTUs of the first frame in an intra coding manner and coding (N−X) columns of CTUs of the first frame in one or both of an inter coding manner and the intra coding manner, and thereby generating a first distributed GDR frame including X columns of intra-coded CTUs, wherein the X columns of CTUs of the first frame are inconsecutive columns and the X columns of intra-coded CTUs of the first distributed GDR frame are inconsecutive columns;

coding X columns of CTUs of the second frame in the inter coding manner, coding Y columns of CTUs of the second frame in the intra coding manner, and coding (N−X−Y) columns of CTUs of the second frame in one or both of the inter coding manner and the intra coding manner, and thereby generating a second distributed GDR frame including Y columns of intra-coded CTUs, wherein positions of the X columns of CTUs of the second frame are corresponding to positions of the X columns of CTUs of the first frame and the Y columns of CTUs of the second frame are inconsecutive columns and the Y columns of intra-coded CTUs of the second distributed GDR frame are inconsecutive columns; and coding X columns of CTUs of the third frame in the inter coding manner, coding Y columns of CTUs of the third frame in the inter coding manner, and coding Z columns of CTUs of the third frame in the intra coding manner, and thereby generating a third distributed GDR frame including Z columns of intra-coded CTUs, wherein positions of the X columns of CTUs of the third frame are corresponding to the positions of the X columns of CTUs of the second frame, positions of the Y columns of CTUs of the third frame are corresponding to positions of the Y columns of CTUs of the second frame, and the Z columns of CTUs of the third frame are inconsecutive columns and the Z columns of intra-coded CTUs of the third distributed GDR frame are inconsecutive columns, wherein the N is an integer equal to or greater than six, each of the X, the Y, and the Z is an integer equal to or greater than two;

wherein each of the X columns of intra-coded CTUs included in the first distributed GDR frame consists of P CTUs that are all coded in the intra coding manner, in which the P is an integer greater than two; each of the Y columns of intra-coded CTUs included in the second distributed GDR frame consists of Q CTUs that are all coded in the intra coding manner, in which the Q is an integer equal to the P; and each of the Z columns of intra-coded CTUs included in the third distributed GDR frame consists of R CTUs that are all coded in the intra coding manner, in which the R is an integer equal to the P.

2. The coding algorithm of claim 1, wherein the N is equal to (X+Y+Z) and the first distributed GDR frame, the second distributed GDR frame, and the third distributed GDR frame are used to replace three Instantaneous Decoding Refresh (IDR) frames composed of an intra frame and two consecutive inter frames following the intra frame.

3. The coding algorithm of claim 1, wherein the X, the Y, and the Z are the same.

4. The coding algorithm of claim 1, wherein the X columns of CTUs of the first frame are coded without referring to data of the (N−X) columns of CTUs of the first frame, and the Y columns of CTUs of the second frame are coded without referring to data of the (N−X−Y) columns of CTUs of the second frame.

5. The coding algorithm of claim 1, wherein a process for coding the X columns of CTUs of the first frame is only allowed to refer to data of the X columns of CTUs of the first frame; a process for coding the Y columns of CTUs of the second frame is only allowed to refer to data of the X columns of CTUs of the second distributed GDR frame and data of the Y columns of CTUs of the second frame; and a process for coding the Z columns of CTUs of the third frame is only allowed to refer to data of the X columns of CTUs of the third distributed GDR frame, data of the Y columns of CTUs of the third distributed GDR frame, and data of the Z columns of CTUs of the third frame.

6. The coding algorithm of claim 1, wherein the X columns of CTUs of the second frame are coded without referring to data of the (N−X) columns of CTUs of the first frame, and the X columns of CTUs of the third frame and the Y columns of CTUs of the third frame are coded without referring to data of the (N−X−Y) columns of CTUs of the second frame.

7. The coding algorithm of claim 1, wherein a process for coding the X columns of CTUs of the second frame is only allowed to refer to data of the X columns of CTUs of the first distributed GDR frame, and a processing for coding the X columns of CTUs of the third frame and the Y columns of CTUs of the third frame is only allowed to refer to data of the X columns of CTUs of the second distributed GDR frame and data of the Y columns of CTUs of the second distributed GDR frame.

8. The coding algorithm of claim 1, wherein any two columns of the X columns of CTUs of the first frame are inconsecutive; any two columns of the Y columns of CTUs of the second frame are inconsecutive; and any two columns of the Z columns of CTUs of the third frame are inconsecutive.

9. The coding algorithm of claim 1, wherein an amount of data of the first distributed GDR frame is less than an amount of data of the first frame; an amount of data of the second distributed GDR frame is less than an amount of data of the second frame; and an amount of data of the third distributed GDR frame is less than an amount of data of the third frame.

10. The coding algorithm of claim 1, wherein when the N is greater than (X+Y+Z), the third distributed GDR frame is generated with an additional step including: coding (N−X−Y−Z) column(s) of CTUs of the third frame in one or both of the inter coding manner and the intra coding manner.

11. A coding algorithm for encoding consecutive frames of a video sequence and thereby realizing distributed Gradual Decoding Refresh (GDR), wherein the consecutive frames include a first frame and a second frame in sequence, each of the first frame and the second frame is composed of N columns of coding tree units (CTUs), and the coding algorithm comprises:

coding X columns of CTUs of the first frame in an intra coding manner and coding (N−X) columns of CTUs of the first frame in one or both of an inter coding manner and the intra coding manner, and thereby generating a first distributed GDR frame including X columns of intra-coded CTUs, wherein the X columns of CTUs of the first frame as a whole is inconsecutive and the X columns of intra-coded CTUs of the first distributed GDR frame as a whole is inconsecutive; and coding X columns of CTUs of the second frame in the inter coding manner and coding Y columns of CTUs of the second frame in the intra coding manner, and thereby generating a second distributed GDR frame including Y columns of intra-coded CTUs, wherein positions of the X columns of CTUs of the second frame are corresponding to positions of the X columns of CTUs of the first frame, and the Y columns of CTUs of the second frame as a whole is inconsecutive and the Y columns of intra-coded CTUs of the second distributed GDR frame as a whole is inconsecutive, wherein the N is an integer equal to or greater than four, each of the X and the Y is an integer equal to or greater than two;

wherein each of the X columns of intra-coded CTUs included in the first distributed GDR frame consists of P CTUs that are all coded in the intra coding manner, in which the P is an integer greater than two; and each of the Y columns of intra-coded CTUs included in the second distributed GDR frame consists of Q CTUs that are all coded in the intra coding manner, in which the Q is an integer equal to the P.

12. The coding algorithm of claim 11, wherein the N is equal to (X+Y), and the first distributed GDR frame and the second distributed GDR frame are used to replace two Instantaneous Decoding Refresh (IDR) frames composed of an intra frame and an inter frame following the intra frame.

13. The coding algorithm of claim 11, wherein the X and the Y are the same.

14. The coding algorithm of claim 11, wherein the X columns of CTUs of the first frame are coded without referring to data of the (N−X) columns of CTUs of the first frame, and the X columns of CTUs of the second frame are coded without referring to the data of the (N−X) columns of CTUs of the first distributed GDR frame.

15. The coding algorithm of claim 11, wherein a process for coding the X columns of CTUs of the first frame is only allowed to refer to data of the X columns of CTUs of the first frame; a process for coding the X columns of CTUs of the second frame is only allowed to refer the data of the X columns of CTUs of the first distributed GDR frame; and a process for coding the Y columns of CTUs of the second frame is only allowed to refer to data of the X columns of CTUs of the second distributed GDR frame and data of the Y columns of CTUs of the second frame.

16. The coding algorithm of claim 11, wherein any two columns of the X columns of CTUs of the first frame are inconsecutive, and any two columns of the Y columns of CTUs of the second frame are inconsecutive.

17. The coding algorithm of claim 11, wherein an amount of data of the first distributed GDR frame is less than an amount of data of the first frame, and an amount of data of the second distributed GDR frame is less than an amount of data of the second frame.

18. The coding algorithm of claim 11, wherein when the N is greater than (X+Y), the second distributed GDR frame is generated with an additional step including: coding (N−X−Y) column(s) of CTUs of the second frame in one or both of the inter coding manner and the intra coding manner.

* * * * *